Feb. 25, 1930.  C. A. MATSON  1,748,297
TEAPOT
Filed April 3, 1929

Inventor
Carl A. Matson
by James R. Hodder
Attorney

Patented Feb. 25, 1930

1,748,297

UNITED STATES PATENT OFFICE

CARL A. MATSON, OF LYNNFIELD, MASSACHUSETTS

TEAPOT

Application filed April 3, 1929. Serial No. 352,174.

My present invention relates to an improved vessel and more particularly to an improved tea pot or the like.

In vessels for steeping beverages, such for example, as tea, it has heretofore been the practice to put the loose tea or other ingredient in a pot with the necessary amount of water and after allowing the same to steep to the right degree, the beverage is poured into smaller containers for consumption. Recently, however, it has become the practice to utilize the now well known tea bag for holding the ingredients for making the beverage, each bag containing a sufficient amount of tea or other like ingredient to prepare a stipulated number of cups of the beverage. When this is employed the tea or other bag is placed in the water within the steeping vessel and allowed to remain in the liquid for a sufficient length of time and then removed from the steeping vessel. Usually the spent ingredient, such as tea, now in a wet condition, is placed on a plate or saucer or other holding vessel and the beverage poured into smaller containers and consumed in the usual way. It has been found that the majority of users of this type of article have not been careful in disposing of the wet and soggy bag holding the wet and spent ingredients, but have placed the same in the handiest place, usually on top of the table. Not only in restaurants but in homes as well this has become the common usage and the table linen has become immediately soiled and indelibly stained with the steeped liquid oozing from the soggy tea bag.

It is the object of my present invention to remedy the condition heretofore noted and to this end I have devised a tea or like pot in which is arranged, adjacent the top or open end thereof, and on one side thereof, a container or receptacle into which may be placed the spent bag of tea or other ingredient, and such receptacle may be provided with perforations or not, as may be desired, and through which perforations, if provided, the liquid oozing from the wet tea bag may pass into the body of liquid within the pot.

I may also, in carrying out my invention, make such container or receptacle integral with the tea pot itself or separate therefrom and detachably secured thereto.

The object of my invention, therefore, is an improved tea pot or the like.

Referring to the drawings, illustrating preferred embodiments of my invention, Fig. 1 is a perspective view of the tea pot with a portion of the side broken away, showing a container or receptacle according to my invention arranged in position;

Figure 1:
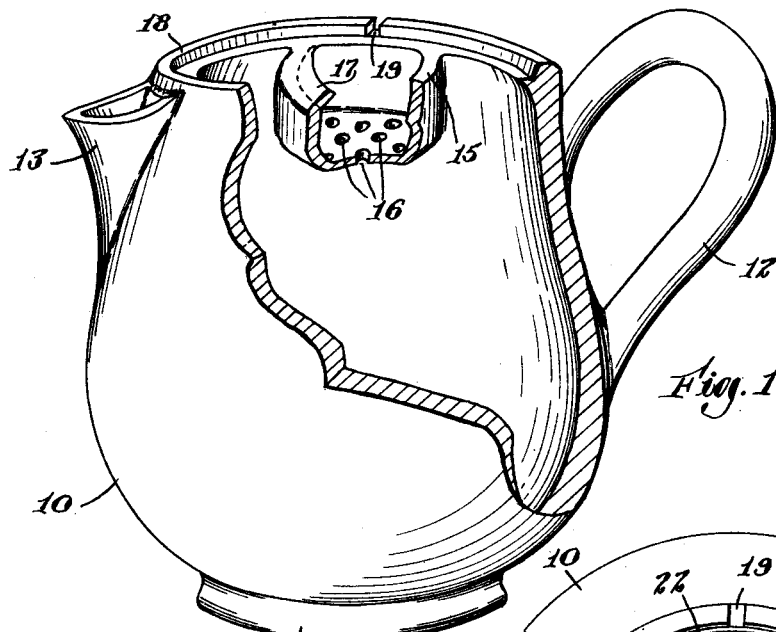
Figure 2:
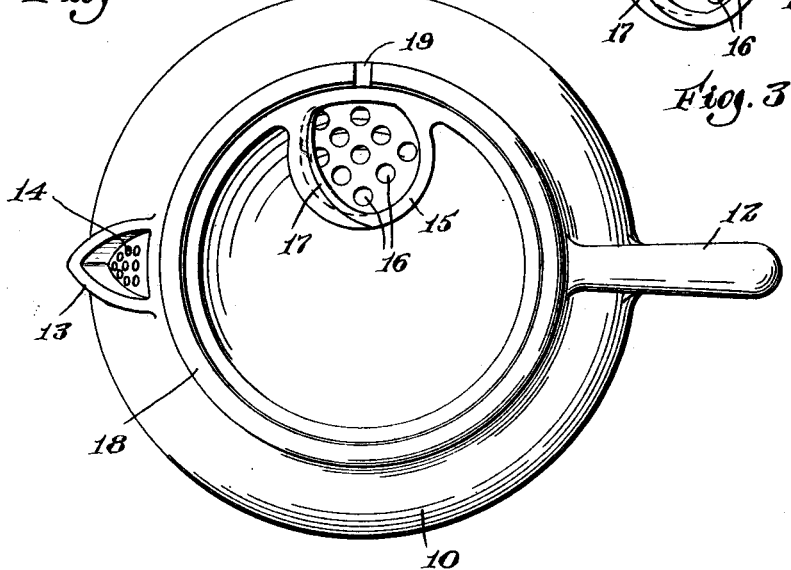
Fig. 2 is a plan view of Fig. 1.

Referring to the drawings, 10 designates a tea pot bowl provided with an integral base 11, also provided on one side with a handle 12 and on the opposite side with a spout 13. The wall of the pot 10 within the spout 13 is provided with the usual plurality of perforations 14 and through which the steeped liquid in the pot 10 may be poured. Referring particularly to Figs. 1 and 2, there is shown at one side thereof and at the upper open end of the tea pot body 10 a container or receptacle 15, the bottom of which, as shown in the drawing, being provided with a plurality of perforations 16 and through which liquid from a wet tea or other bag placed therein may drip into the tea pot body 10. On what may be termed the forward side of the open end of the container or receptacle 15 or that portion of such container nearest the spout 13, is provided with an inwardly extending lip 17 which prevents the wet tea bag from falling into the liquid within the pot 10 during the act of pouring the steeped liquid therefrom. Adjacent the open end of the container or receptacle 15 and on the rim 18 of the tea pot body 10 is provided a notch 19 which will allow the string or wire of the tea ball to extend outwardly from the receptacle or container 15, even though the cover of the tea pot is in place.

Figure 3:
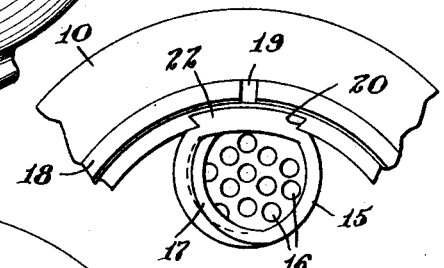
Fig. 3 is a fragmentary plan view showing a container or receptacle separate from but detachably connected to the tea pot.

The form of the invention shown in Figs. 1 and 2 has the container or receptacle formed integrally with the body 10 of the tea pot, and referring now to Fig. 3, I have shown the body 10 of the tea pot provided on one side of and adjacent the top thereof with a dovetailed groove 20. 21 designates a container or receptacle similar to the container or receptacle 15 utilized in connection with Figs. 1 and 2, but such receptacle 21 is provided on one side thereof with an inwardly or laterally extending dovetailed member 22, which is a relatively loose fit in the dovetailed member 20 in the wall of the body 10 of the tea pot. In this form it will be apparent that I may readily remove the receptacle 21 from the tea pot body 10 when it is desired to clean the same or clean the pot 10 and that such receptacle is not easily disarranged from this position, being held securely in the dovetailed member 20 by the corresponding member 21. This form also of my invention is provided with a groove or slot 19 on the rim 18 of the pot.

Having thus described my invention, what I claim as new is:

1. The combination with a receptacle for steeping beverages and the like, of a container attached to the inner upper wall thereof and at one side thereof.

2. In a container for steeping beverages and the like, the combination with a hollow body member, of a container of smaller capacity than the first said container and located on one side of the inner wall and at the upper end thereof.

3. In a container for steeping beverages and the like, a hollow body member, provided with an open end, a smaller auxiliary container located within the body member and secured thereto, such body member being provided with a transversely arranged slot adjacent the container.

4. In a receptacle for steeping beverages and the like, the combination with a hollow body open at one end thereof and provided at its open end with a transversely arranged slot, an open end container secured to the inner wall of said hollow body member and adjacent the transversely arranged slot, and a plurality of perforations arranged in the bottom of the smaller container.

In testimony whereof, I have signed my name to this specification.

CARL A. MATSON.